United States Patent [19]
Yokoyama et al.

[11] Patent Number: 5,708,900
[45] Date of Patent: Jan. 13, 1998

[54] CAMERA

[75] Inventors: Kunio Yokoyama, Hino; Hiroyuki Ando, Hachioji, both of Japan

[73] Assignee: Olympus Optical Co., Ltd., Tokyo, Japan

[21] Appl. No.: 260,197

[22] Filed: Jun. 20, 1994

[30] Foreign Application Priority Data

Jun. 18, 1993 [JP] Japan .................... 5-147875
Jan. 10, 1994 [JP] Japan .................... 6-000795

[51] Int. Cl.$^6$ .................... G03B 17/02; G03B 17/26
[52] U.S. Cl. .................... 396/538; 396/535
[58] Field of Search .................... 354/275, 288; 396/535, 538, 511

[56] References Cited

U.S. PATENT DOCUMENTS

| | | | |
|---|---|---|---|
| 3,096,699 | 7/1963 | Harvey et al. | 354/288 |
| 3,543,664 | 12/1970 | Kremp | 354/288 |
| 4,095,249 | 6/1978 | Miuraz | 354/288 |
| 4,363,547 | 12/1982 | Hashimoto et al. | 354/212 |
| 4,401,379 | 8/1983 | Tamamara et al. | 354/214 |
| 4,887,114 | 12/1989 | Yamamoto et al. | 354/288 |
| 5,177,518 | 1/1993 | Taniguchi et al. | 354/174 |
| 5,247,325 | 9/1993 | Tanahashi | 354/275 |
| 5,258,793 | 11/1993 | Tsugi et al. | 354/288 |
| 5,307,099 | 4/1994 | Kawamura et al. | 354/21 |
| 5,347,332 | 9/1994 | Wakasatashi | 354/173.1 |

FOREIGN PATENT DOCUMENTS

| | | |
|---|---|---|
| 63-271326 | 11/1988 | Japan . |
| 41625 | 1/1992 | Japan . |
| 470637 | 3/1992 | Japan . |
| 480734 | 3/1992 | Japan . |
| 4140733 | 6/1992 | Japan . |
| 5119391 | 5/1993 | Japan . |

Primary Examiner—Russell E. Adams
Assistant Examiner—Nicholas J. Tuccillo
Attorney, Agent, or Firm—Finnegan, Henderson, Farabow, Garrett & Dunner, L.L.P.

[57] ABSTRACT

A camera equipped with a compact mechanism for loading or unloading film cassettes, has an R fork that transmits a drive force to the spool shaft of a film cassette in a cassette compartment so as to rotate the spool shaft in a predetermined direction. The cassette compartment is such that two opposite end faces in the axial direction of the spool are generally of the same size as two opposite end faces of the loaded film cassette and the R fork is urged in such a direction that it protrudes into the cassette compartment along the spool shaft and that it is capable of movement between two positions, one being where it protrudes into the cassette compartment and the other being where it retracts therefrom.

5 Claims, 6 Drawing Sheets

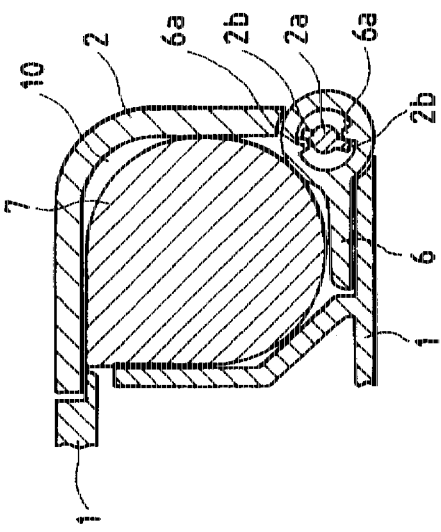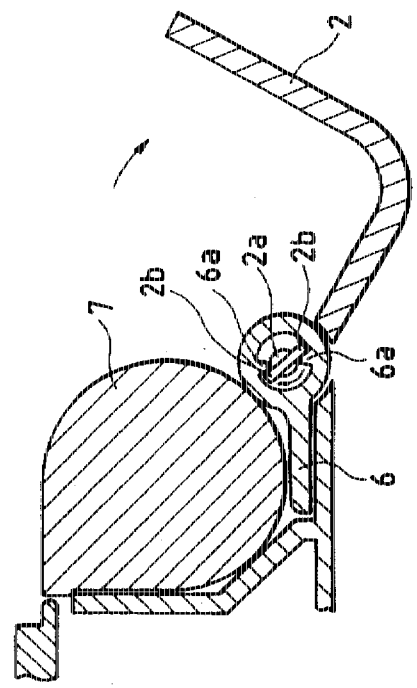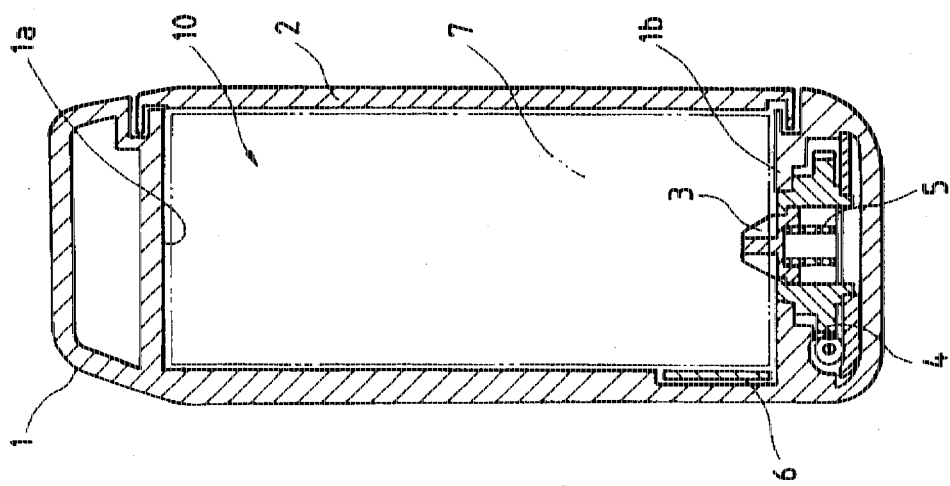

5,708,900

CAMERA

BACKGROUND OF THE INVENTION

This invention relates to a camera adapted for film feeding-out type cassettes (i.e., a roll film).

Various proposals have heretofore been made to enable film cassettes to be loaded into or unloaded from cameras. One example is illustrated in FIG. 1; as shown, a cassette compartment which is formed on a lateral side of the camera body 101 is made inclined on both of its top and bottom surfaces. The user puts one of his fingers (not shown) on the top of a film cassette 107 and pivots it about an engaging member 103 so that it is loaded into or unloaded from the camera body.

Unexamined Published Japanese Patent Application (kokai) Sho 62-156641 teaches another example which is illustrated in FIG. 2; as shown, the bottom of a camera body 101 is provided not only with an opening 101a through which a film cassette 107 can be loaded or unloaded but also with a lid 101b. According to this technique, the film cassette 107 is loaded or unloaded in the axial direction of the cassette spool.

The conventional techniques described above have their own problems. The first technique illustrated in FIG. 1 effects cassette loading or unloading by pivoting the cassette 107 and, to this end, an escape for the cassette 107 must be formed in the inner surfaces of the cassette compartment but then the camera body becomes unduly bulky. This is certainly a disadvantageous factor to today's camera users who favor compactness, as well as high camera performance.

The second technique disclosed in unexamined Published Japanese Patent Application (kokai) Sho 62-156641, supra, presents difficulty in assembling various mechanisms and associated parts on the lid 101b and this is also a factor that increases the size of the camera body.

SUMMARY OF THE INVENTION

The present invention has been accomplished under these circumstances and has as an object providing a camera that uses a compact cassette loading/unloading mechanism depending on a separate mechanism for film feeding and which yet enables film loading in the radial direction of the cassette.

Another object of the invention is to provide a camera that permits other elements than the film cassette to be installed in the thrust direction of the cassette.

The present invention has been accomplished under these circumstances and has as an object providing a camera that is equipped with a compact mechanism for loading or unloading film cassettes.

According to the present invention, there is provided a camera including:
- a cassette compartment that is generally of the same length as the film cassette to be loaded and which has an opening that enables the film cassette to be loaded only in a direction that is generally perpendicular to the rotating shaft of the cassette; and
- an engaging member that is provided to be movable between two positions, one being where the engaging member protrudes into the cassette compartment and the other being where the engaging member retracts from within the cassette compartment, and which engages the spool shaft of the film cassette when it is loaded in the cassette compartment.

The part of the engaging means which engages the spool shaft is of such a shape that it is generally conical or a truncated conical shape in the direction in which the engaging means protrudes.

According to another aspect of the invention, there is provided a camera including:
- a cassette compartment that is generally of the same length as the film cassette to be loaded and which has an opening that enables the film cassette to be loaded only in a direction that is generally perpendicular to the rotating shaft of the film cassette;
- an engaging member that is provided to be movable between two positions, one being where the engaging member protrudes into the cassette compartment and the other being where the engaging member retracts from within the cassette compartment, and which engages the spool shaft of the film cassette when it is loaded in the cassette compartment;
- a lid means that is capable of rotation between two positions, one being where the cassette compartment is exposed and the other being where the cassette compartment is covered; and
- a pushing means which, when the lid means has moved through a given minimum angle, is operatively associated with the lid means to insure that the loaded film cassette is moved outside the cassette compartment by moving the engaging member to the position where it retracts from within the cassette compartment.

The pushing means may be provided in such a way that the center of the rotating shaft of the pushing means is common to the center of the rotating shaft of the lid means.

According to another aspect of the invention, there is provided a camera including:
- a cassette compartment having two opposite end faces that are generally of the same size as those two end faces of the film cassette to be loaded which oppose each other in the direction of the spool shaft, the distance between the first pair of opposite end faces being generally the same as the distance between the second pair of opposing end faces;
- a rotating member that is capable of movement between two positions, one being where it protrudes from the cassette compartment to engage the spool shaft of the film cassette loaded in the cassette compartment while at the same time it is capable of rotating the spool shaft in a predetermined direction and the other direction being where it retracts from within the cassette compartment when the film cassette is being loaded or unloaded; and
- an urging means for urging the rotating member in a direction in which the rotating member protrudes into the cassette compartment.

According to the present invention, there is provided a camera including:
- a cassette compartment that is generally of the same length as the film cassette to be loaded and which has an opening that enables the film cassette to be loaded only in a direction that is generally perpendicular to the rotating shaft of the film cassette;
- a lid means that is provided to be movable between two positions, one being where the cassette compartment is exposed and the other being where the cassette compartment is covered;
- a holding means that is provided on the lid means and which, when the lid means is moved to the position where the cassette compartment is covered, holds the film cassette in such a way that it is loaded into the opening in the cassette compartment; and an engaging member that is provided to be movable between two positions, one being where it protrudes into the cassette compartment and the other being where it retracts therefrom, and which, when the lid means is moved to the position where the cassette compartment is covered, engages the spool shaft of the film cassette being held.

In the invention, a camera includes:

a cassette compartment into which a cassette is to be loaded, the cassette compartment being such that these two end faces which oppose each other in the direction of the spool shaft are generally of the same size as two opposite end faces of the cassette that has been loaded; and an engaging member that engages the spool shaft of the loaded cassette and which drives the spool shaft for rotation, the engaging member being urged along the spool shaft in a direction in which it protrudes into the cassette compartment and the engaging member being provided to be movable between two positions, one being where it protrudes into the cassette compartment and the other being where it retracts therefrom.

The portion of the engaging member which protrudes into the cassette compartment may be generally of a pyramidal shape, a truncated pyramidal shape, generally of a polygonal conical shape or a truncated polygonal conical shape.

The cassette compartment may be provided with a pushing means that pushes the cassette out of the cassette compartment when the cassette is being unloaded.

The camera may further include a lid for covering the cassette compartment, and a drawing means which, when the lid has moved a through given minimum angle in a direction in which the cassette compartment is exposed, moves the loaded cassette outside the cassette compartment.

According to the present invention, there is provided a camera including:

a cassette compartment into which a cassette is to be loaded, the cassette compartment being such that these two end faces which oppose each other in the direction of the spool shaft are generally of the same size as two opposite end faces of the cassette that has been loaded;

an engaging member that engages the spool shaft of the loaded cassette and which drives the spool shaft for rotation, the engaging member being urged along the spool shaft in a direction in which it protrudes into the cassette compartment and the engaging member being provided to be movable between two positions, one being where it protrudes into the cassette compartment and the other being where it retracts therefrom;

a lid that is provided to be movable between two positions, one being where the cassette compartment is covered and the other being where it is exposed; and a cassette holding means provided on the lid to hold the cassette.

The rotating shaft of the lid may be provided to be generally parallel to the spool shaft.

According to another aspect of the invention, there is provided a camera film cassette containing camera including:

a camera body;

a film cassette compartment that is included in the camera body for containing the film cassette, the film cassette compartment including at least two faces, one opposing one end face of the film cassette and the other opposing the other end face of the film cassette, and the film cassette compartment enabling the film cassette to be located between the one face and the other face; and a spool engaging shaft that engages the spool shaft included in the film cassette in order to rotate the spool shaft, the spool engaging shaft being located on either the one face or the other face in such a way that it protrudes into the film cassette compartment from the face wherein it is located, the spool engaging shaft having a tapered distal end, the protruding portion of the spool engaging shaft being movable between two positions, one being where it is protruded into the film cassette compartment and the other being where it engages the spool shaft included in the film cassette outside the film cassette compartment, whereby the film cassette, when it is inserted into the film cassette compartment, pushes the spool engaging shaft aside to be located outside the film cassette compartment so as to permit the insertion of the film cassette.

According to the present invention, there is provided a film cassette containing camera including:

a camera body;

a film cassette compartment that is included in the camera body for containing the film cassette, the film cassette compartment including at least two faces, one opposing one end face of the film cassette and the other opposing the other end face of the film cassette, and the film cassette compartment enabling the film cassette to be located between the one face and the other face; and a spool engaging shaft that engages the spool shaft included in the film cassette in order to rotate the spool shaft, the spool engaging shaft being located on either the one face or the other face to protrude therefrom into the film cassette compartment, the protruding portion being tapered and movable along its own axis to be located outside the film cassette compartment, whereby the film cassette, when it is inserted into the film cassette compartment, pushes the spool engaging shaft aside to be located outside the film cassette compartment so as to permit the insertion of the film cassette, and the spool engaging shaft, when the loading of the film cassette is complete, protrudes again into the film cassette compartment for engaging the spool shaft.

According to another aspect of the invention, there is provided a film cassette containing camera including:

a camera assembly;

a film cassette compartment that is included in the camera assembly for containing the film cassette, the film cassette compartment including at least two faces, one opposing one end face of the film cassette and the other opposing the other end face of the film cassette, and the film cassette compartment enabling the film cassette to be located between the one face and the other face;

a spool engaging shaft that engages the spool shaft included in the film cassette in order to rotate the spool shaft, the spool engaging shaft being located on either the one face or the other face to protrude therefrom into the film cassette compartment, the protruding portion being tapered and movable along its own axis to be located outside the film cassette compartment;

a lid means that is hooked up to the camera assembly in such a way that it can be opened or closed as required to cover the film cassette compartment; and a film cassette ejecting means that ejects the film cassette out of the film cassette compartment in operative association with the opening of the lid means;

wherein the film cassette, when it is inserted into the film cassette compartment, pushes the spool engaging shaft aside to be located outside the film cassette compartment so as to permit the insertion of the film cassette and wherein the film cassette ejecting means, when the lid means starts to open while the film cassette is contained in the film cassette compartment, is actuated in operative association to push the film cassette so that it is ejected out of the film cassette compartment while, at the same time, the spool engaging shaft moves along its own axis to be located outside the film cassette compartment so as to permit the ejection of the film cassette out of the film cassette compartment.

The cassette compartment in the camera of the present invention is such that two opposite end faces in the axial direction of the spool are generally of the same size as two opposite end faces of the loaded film cassette and the R fork is urged in such a direction that it protrudes into the cassette compartment along the spool shaft then it is capable of movement between two positions, one being where it protrudes into the cassette compartment and the other being where it retracts therefrom.

In a camera according to the third embodiment of the invention, a lid member is provided in such a way that it can be opened or closed with respect to the camera body and a means for holding the film cassette which is to be used within the camera body is provided inside the lid member. With the cassette being held by the cassette holding means, the lid member is opened or closed with respect to the camera body as this is required to load the cassette into the camera body or unload it therefrom.

In a camera according to the fourth embodiment of the invention, the film cassette is moved in a direction generally perpendicular to the film take-up shaft within the cassette, thereby assuring the latter to be held by the cassette holding means provided inside the lid member.

BRIEF DESCRIPTION OF THE DRAWINGS

In the accompanying drawings:

FIG. 4 is a longitudinal section of the cassette compartment in the camera of the first embodiment;

FIG. 5 is a cross-sectional view showing the lower part of the cassette compartment in the camera of the first embodiment as it is loaded with a film cassette and with the back lid closed;

FIG. 6 is a cross-sectional view showing the lower part of the cassette compartment in the camera of the first embodiment as it is loaded with the film cassette and with the first operatively associated claws having contacted the second claws;

DESCRIPTION OF THE PREFERRED EMBODIMENTS

First and second embodiments of the invention are described below with reference to FIGS. 3 to 13.

Figure 3:
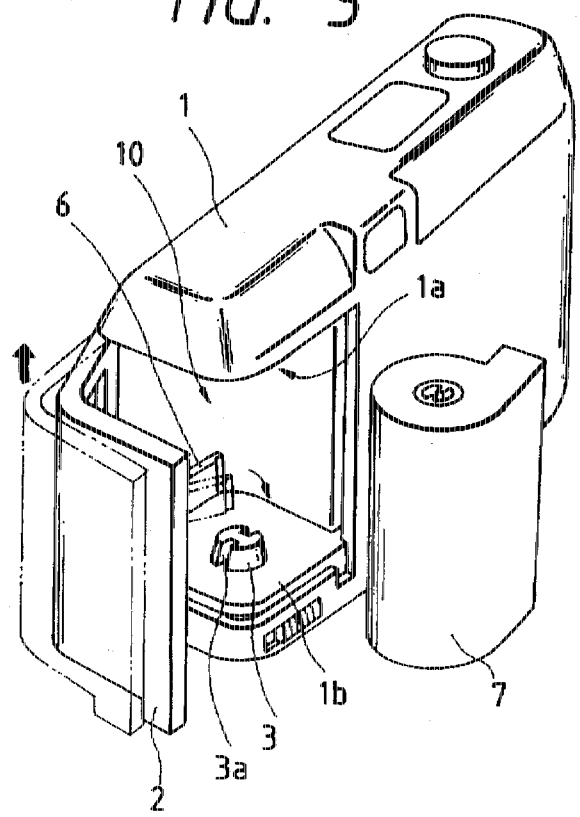
FIG. 3 is a perspective view of a camera according to the first embodiment of the invention.

FIG. 3 is a perspective view of a camera according to the first embodiment of the invention, showing the cassette compartment and its nearby area in particular detail.

Figure 1:
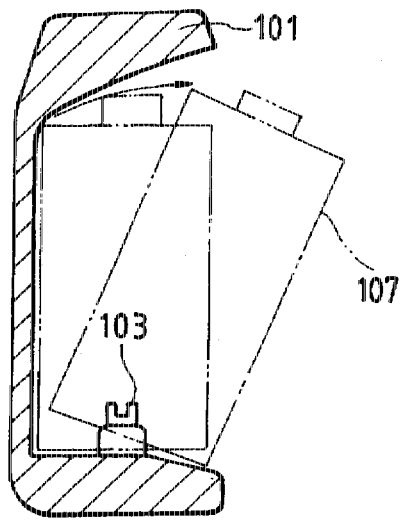
FIG. 1 is a diagram illustrating a prior art method of loading a film cassette into a camera.
Figure 2:
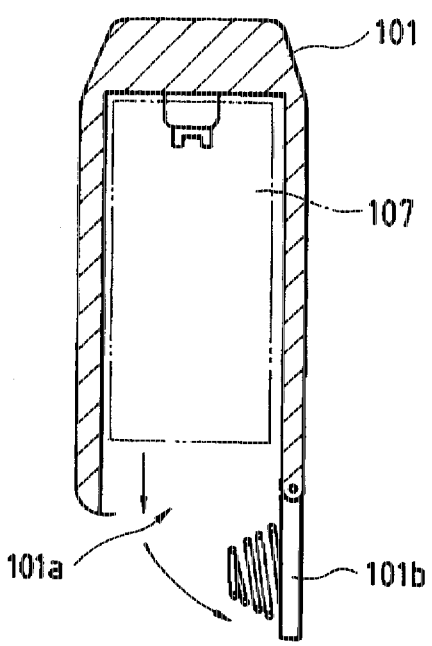
FIG. 2 is a diagram showing another prior art method of loading a film cassette into a camera.

As shown, a back lid 2 which can be opened or closed as required is provided in an area extending from one side to the back side of the cassette compartment 10 formed on a lateral side of a camera body 1. The lid 2 is shown open in FIG. 3. As also shown in FIG. 1, a film cassette 7 can be loaded into the cassette compartment 10. At the center of the bottom face 1b of the cassette compartment 10, there is provided a protruding R fork 3 (i.e., engaging member) which, when the film cassette 7 is loaded, engages its spool shaft so that the latter is driven to rotate. The R fork 3 is generally in a frustoconical shape and has cutouts 3a formed in such a way as to engage the spool shaft.

An arm 6 for pushing the film cassette 7 out of the cassette compartment 10 is provided on the inner surface of the latter in its lower front portion.

FIG. 4 is a longitudinal section of the cassette compartment 10 in the camera of the first embodiment under consideration.

As shown, the inner surface of the cassette compartment 10 has its upper end face 1a and lower end face 1b formed in such a way that, when it is loaded with the film cassette 7, those faces will be opposite to the upper and lower end faces, respectively, of the cassette 7 in its axial direction. The upper and lower end faces 1a and 1b are shaped to be of substantially the same size as the cassette 7 and are formed in such a way that they are substantially in an opposing relationship with respect to the upper and lower end faces of the cassette 7. This arrangement permits the cassette 7 to be loaded or unloaded only in a direction that is perpendicular to the spool shaft.

The R fork 3 which is generally in a frustoconical shape is urged by a spring 5 toward the interior of the cassette compartment 10. The R fork 3 is adapted to rotated in response to a drive gear 4 that is driven by a drive source (not shown) but it is free to move in the axial direction of the spool. This arrangement assures that during the loading or unloading of the film cassette 7, the R fork 3 is depressed on its tapered face and the axial component of the depressive force will contract the urging spring 5, thereby causing the R fork 3 to retract from within the cassette compartment 10.

When the cassette 7 is completely loaded in the cassette compartment 10, the R fork 3 is fitted into the mating surface of the spool shaft which comes into engagement with the cutouts 3a. When the drive gear 4 rotates, the resulting rotational force is transmitted to the R fork 3 and thence to the cassette 7 for rotating it, whereby the film is rewound or advanced as required.

The mechanism for unloading the film cassette 7 in the first embodiment is described below with reference to FIGS. 5 to 7.

FIG. 5 is a cross-sectional view showing the lower part of the cassette compartment 10 in the camera as it is loaded with the cassette 7 and with the back lid 2 closed.

The back lid 2 is adapted to rotate about and together with a shaft 2a. The outer circumference of the shaft 2a has two ridges of a first operatively associated claw 2b that extend radially outward. The arm 6 is provided in the lower part of the inner front surface of the cassette compartment 10 in such a way that it is rotatable about the shaft 2a. The distal end portion of the arm 6 is in substantial contact with the outer circumference of the loaded cassette 7. A hollow circular portion is formed at the basal end of the arm 6 and two ridges of a second operatively associated claw 6a are formed to protrude radially inward from the inner circumference of the hollow circular portion in those areas which correspond to the respective ridges of the first claw 2b.

Suppose the back lid 2 shown in FIG. 5 is rotated to open. As it is rotated progressively, the first claws 2b rotate clockwise until they come into engagement with the second claws 6a of the arm 6 by contacting their right side.

FIG. 6 is a cross-sectional view showing the lower part of the cassette compartment 10 in the camera as it is loaded with the cassette 7 and with the first claws 2b having contacted the second claws 6a.

Suppose the back lid 2 shown in FIG. 6 is further rotated to open. As it is rotated progressively, the arm 6 also rotates and its distal end portion pushes the film cassette 7 out of the cassette compartment 10.

Figure 7:
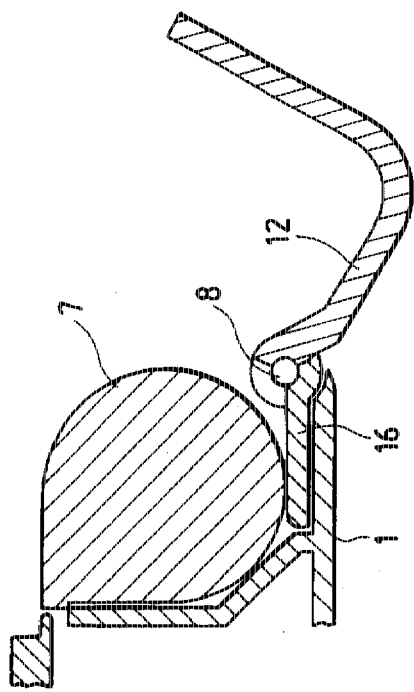
FIG. 7 is a cross-sectional view showing the lower part of the cassette compartment in the camera of the first embodiment as the film cassette is being pushed out of the compartment by means of a pusher arm.

FIG. 7 is a cross-sectional view showing the lower part of the cassette compartment 10 in the camera as the cassette 7 is being pushed out of the compartment 10 by the means of the arm 6.

When the cassette 7 is being pushed out, the R fork 3 is again retracted from the cassette compartment 10 under the axial component of the depressive force developing on the tapered face of the cone.

It should be noted here that the back lid 2 shown in FIG. 6 corresponds to the back lid indicated by a slid line in FIG. 3 whereas the back lid 2 shown in FIG. 7 corresponds to the back lid indicated by a one-long-and-two-short dashed line in FIG. 3.

Figure 9:
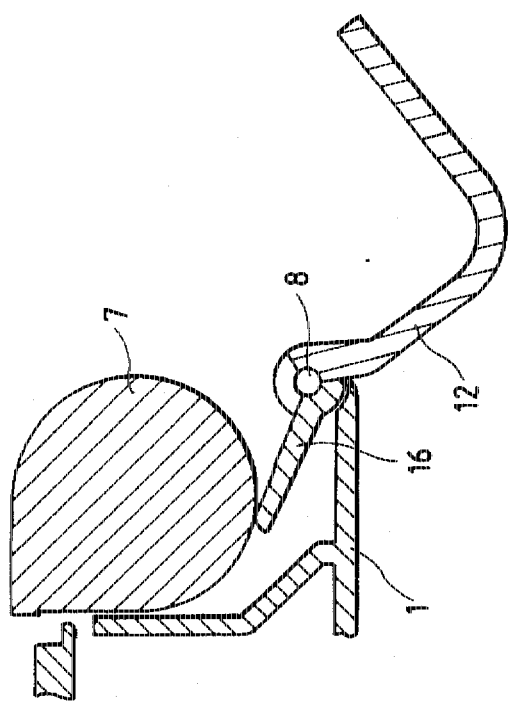
FIG. 9 is a cross-sectional view showing the lower part of the cassette compartment in the camera of the second embodiment as it is loaded with the film cassette and with the first contact face having contacted the second contact face.
Figure 8:
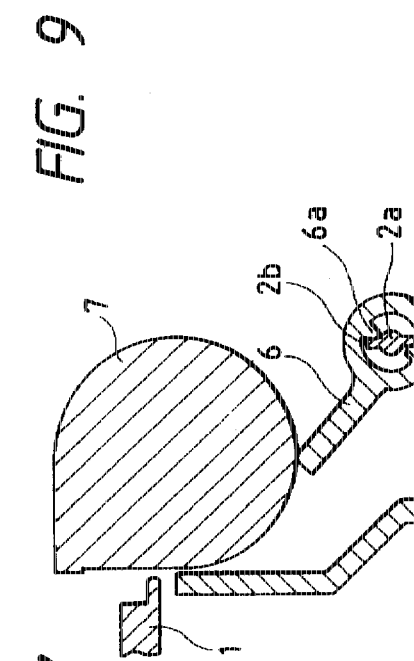
FIG. 8 is a cross-sectional view showing the lower part of the cassette compartment in the camera of the second embodiment as it is loaded with a film cassette and with the back lid closed.
Figure 10:
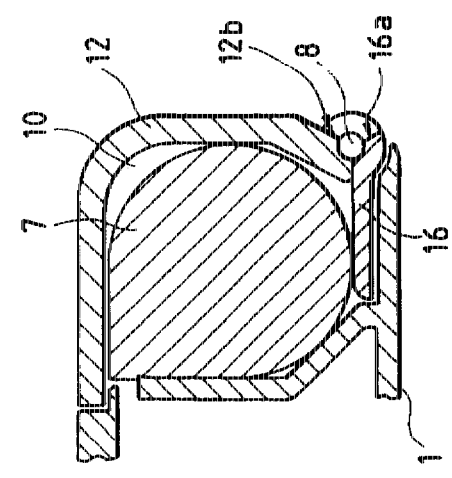
FIG. 10 is a cross-sectional view showing the lower part of the cassette compartment in the camera of the second embodiment as the film cassette is being pushed out of the compartment by means of a pusher arm.

We now describe a camera according to the second embodiment of the invention with reference to FIGS. 8 to 10.

The camera of the second embodiment is basically of the same construction as the first embodiment, except for the back lid and the operatively associated claws of the pusher arm. The other aspects of the construction of the second embodiment are equivalent to those of the first embodiment and will not be described below in detail.

FIG. 8 is a cross-sectional view showing the lower part of the cassette compartment 10 in the camera of the second embodiment as it is loaded with the cassette 7 and with the back lid 12 closed.

The back lid 12 is adapted to rotate about a shaft 8 and it has a first contact face 12b formed on one lateral face of the basal end. The pusher arm 16 is also adapted to rotated about the shaft 8 and has a second contact face 16a formed at the basal end which is in an opposing relationship with the first contact face 12b.

Suppose the back lid 12 shown in FIG. 8 is rotated to open. As it is rotated progressively, the first contact face 12b also rotates until it contacts the second contact face 16a.

FIG. 9 is a cross-sectional view showing the lower part of the cassette compartment 10 in the camera as it is loaded with the cassette 7 and with the first contact face 12b having contracted the second contact face 16a.

Suppose the back lid 12 shown in FIG. 9 is further rotated to open. As it is rotated progressively, the second contact face 16a is depressed, whereby the arm 16 will rotate about the shaft 8 in response to the rotation of the back lid 12 and its distal end portion pushes the film cassette 7 out of the cassette compartment 10.

FIG. 10 is a cross-sectional view showing the lower part of the cassette compartment 10 in the camera as the cassette 7 is being pushed out of the compartment 10 by means of the arm 16.

In the cameras of the first and second embodiments described above, the inner surfaces of the cassette compartment which will be opposite to the upper and lower end faces of the film cassette when the latter is loaded are shaped in such a way that they are substantially in an opposing relationship with respect to the upper and lower end faces of the cassette. Because of this arrangement, the spaces of the camera body that are above and below the cassette compartment can efficiently be used to reduce the overall size of the camera.

Figure 11:
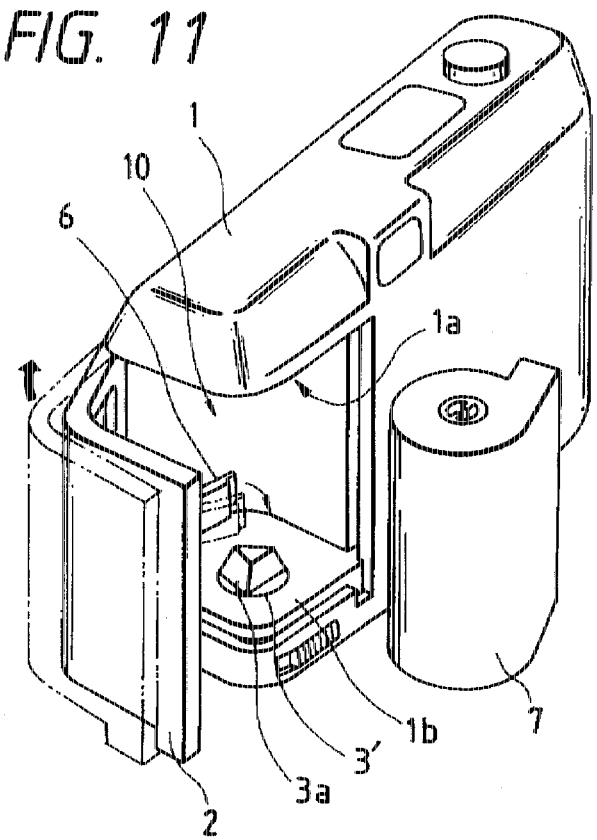
FIGS. 11, 12 and 13 are views showing the modifications of the engaging member.
Figure 12:
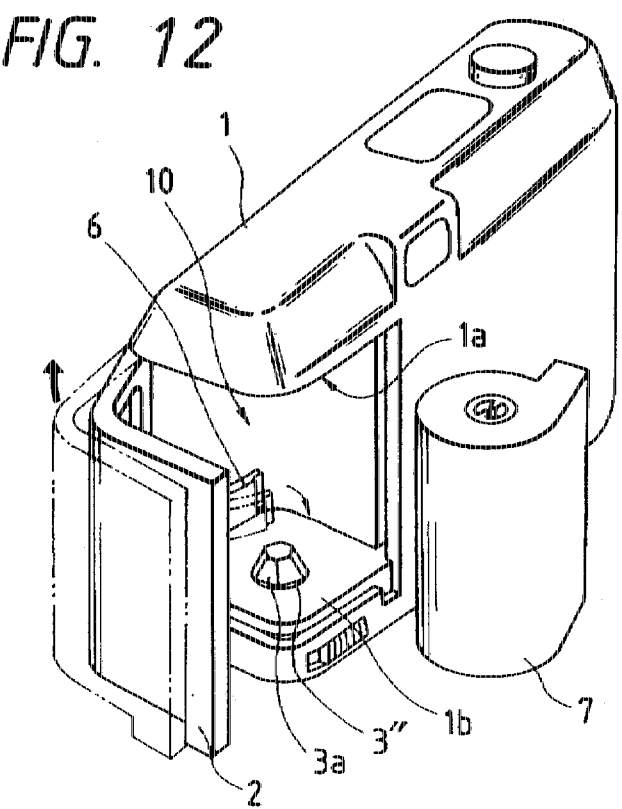
Figure 13:
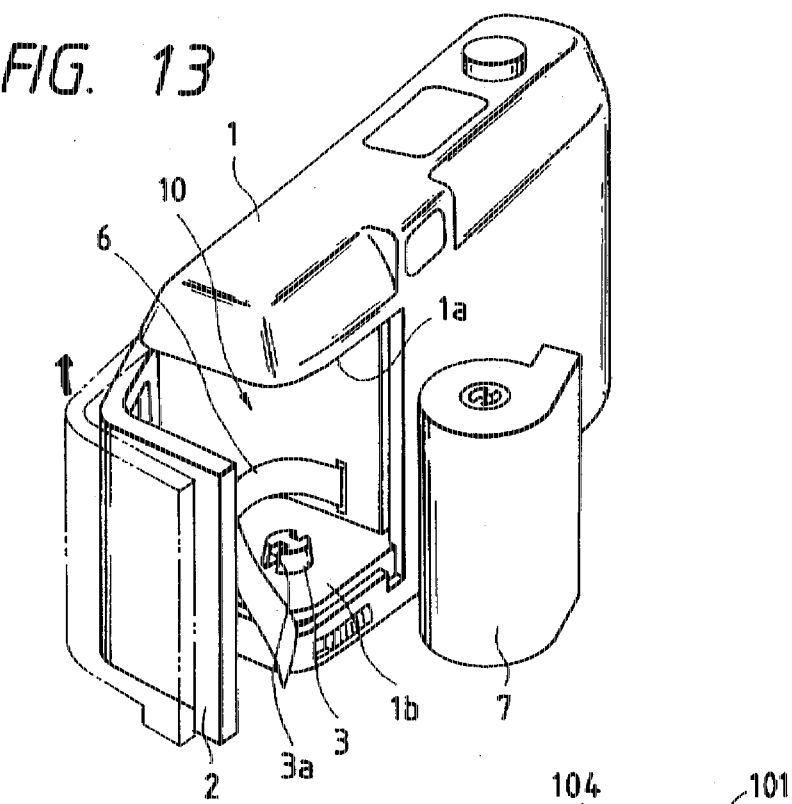

The R fork which drives the spool shaft has a generally frustoconical outer shape; therefore, when a film cassette is loaded or unloaded, the axial component of the depressive force that develops on the tapered face of the cone causes the R fork to retract from within the cassette compartment to come to a position that will not interfere with the loading or unloading of the cassette. Also, as modifications, it is possible to use a truncated triangular cone shaped R-fork as shown in FIG. 11 or a truncated polygonal (hexagonal) cone shaped R-form as shown in FIG. 12.

If desired, a member (e.g., a ribbon or flexible strip member 6 shown in FIG. 13) may be provide that is operatively associated with the opening of the back lid to push the film cassette out of the cassette compartment and this insures that the film cassette can be easily taken out of the compartment in the absence of any grips, recesses or other means to hold the cassette with fingers. This eliminates the need to provide extra spaces both above and below the cassette compartment for facilitating the loading and unloading of film cassettes and, hence, a compact camera can be constructed.

As described on the foregoing pages, the present invention provides a camera equipped with a compact mechanism for loading or unloading film cassettes.

Further embodiments of the invention are described below with reference to FIGS. 14 and 15.

Figure 14:
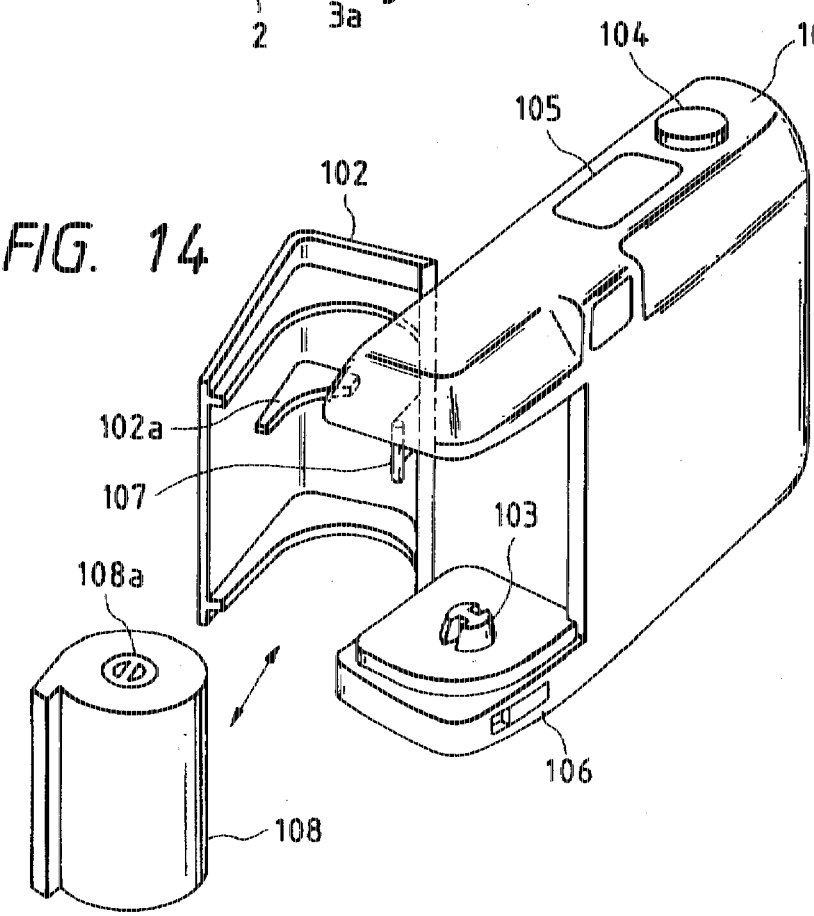
FIG. 14 is a perspective view showing the construction of a camera according to the third embodiment of the invention.

FIG. 14 is a perspective view of a camera according to the third embodiment of the invention, showing a lid 102 and its nearby area in particular detail.

As shown, lid 102 which can be opened or closed as required for loading or unloading a film cassette is provided on a lateral side of the camera body. The lid 102 is formed in a generally U shape and one of its ends is hinged pivotally on the camera body 101. The lid 102 is shown open in FIG. 14. The outer surface of the lid 102, when it is closed with respect to the camera body 101, is part of the outer surface of the latter.

As shown, the film cassette 108 can be loaded inside the lid 102. Stated more specifically, the cassette 108 is held not only by a lug 102a provided on the inner surface of one side wall to function as a cassette holding means but also by a cassette retainer 107 provided on the inner surface opposing the lug 102a. The lug 102a is formed as an integral part of the inner surface of the lid 102. If desired, the lug 102a may be formed as a separate member that is secured inside the lid 102. In this alternative case, the lug 102a need not be made of the same material as the lid 102 but may be formed of any material such as a metal.

The cassette retainer 107 as used in the third embodiment is a metal leaf spring with a curved surface. If desired, the retainer may be formed of a plane surface and it may be made of a non-metallic material such as plastics. Needless to say, the retainer 107 may be formed as an integral part of the lid 102.

The cassette compartment in the camera body 101 has a protruding member 103 that engages a spool shaft 108a for driving it to rotate. The spool shaft 108a is provided within the cassette 108 and functions as a film take-up shaft. The engaging member 103 is generally in a frustoconical shape and has cutouts that come into engagement with the spool shaft 108a.

The engaging member 103 is urged in such a way that at least when the lid 102 is opened or closed, it is retractable from within the cassette compartment under an applied axial force.

To make the camera ready for shooting, the cassette 108 is held by the lid 102, which is then closed. At the same time, the engaging member 103 is depressed by the bottom of the cassette 108 in counteraction against the urging force so that it is retracted from the cassette compartment for the time being until the spool shaft 108a comes above the engaging member 103, which then pops up under the urging force to come into engagement with the spool shaft 108a, so that it drives the latter to have the film unrolled from the cassette 108. Thus, the user can easily set the camera ready for shooting.

After shooting is done, the user takes up the film in the cassette 108 and manipulates a control knob 106 to open the lid 102. Since the lid 102 is so shaped that the cassette 108 becomes partly exposed, the user can easily unload the cassette 108.

Although not shown, lenses and prisms in the finder optics are mounted above the cassette compartment in the camera body 101, whereas the drive mechanism (not shown) for the engaging member 103 and the mechanism for opening or closing the lid 102 are mounted below the cassette compartment.

As described above, the camera according to the third embodiment of the present invention permits the finder optics, drive mechanisms, electrical components and various other parts to be installed both above and below the cassette compartment. This increases the degree of freedom in system layout, thereby making it possible to construct a more compact camera.

We now describe the fourth embodiment of the present invention.

Figure 15:
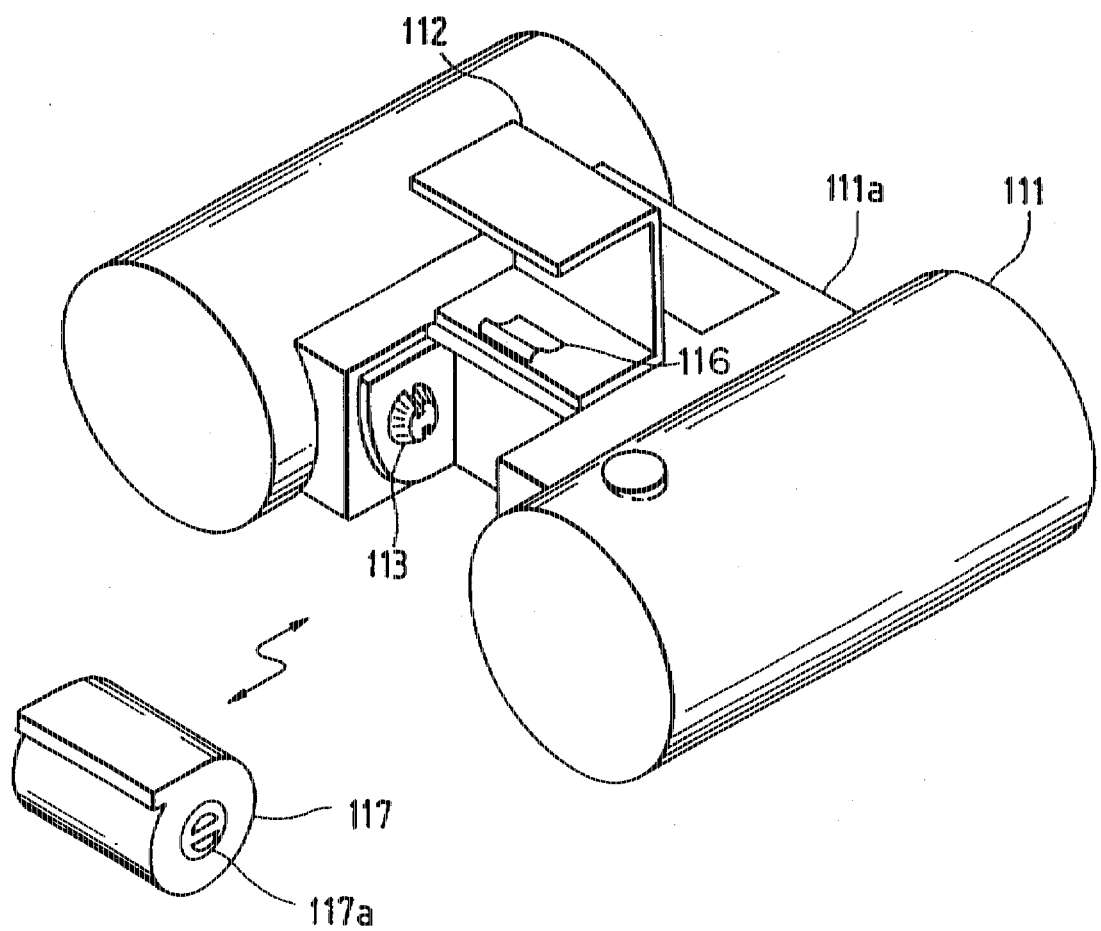
FIG. 15 is a perspective view showing the construction of a camera according to the fourth embodiment of the invention.

FIG. 15 is a perspective view showing a binocular and camera combination 111 according to the fourth embodiment of the invention. As shown, the camera body 111a of the combination camera 111 has a lid 112 attached on one side thereof in such a way that it can be opened or closed as necessary. The lid 112 is shown open in FIG. 15.

As shown, a film cassette 117 can be loaded inside the lid 112 so that it is held be means of a cassette retainer 116. The cassette compartment in the camera body 111a has a protruding member 113 that engages a spool shaft 117a for driving it to rotate. The spool shaft 117a is provided within the cassette 117 and functions as a film take-up shaft. As in the first embodiment, the engaging member 113 is generally in a frustoconical shape and has cutouts that come into engagement with the spool shaft 117a.

Again, the engaging member 113 is urged in such a way that at least when the lid 112 is opened or closed, it is retractable from within the cassette compartment under an applied axial force. To make the camera ready for shooting, the cassette 117 is held by the lid 112, which is then closed.

At the same time, the engaging member 113 is depressed by the bottom of the cassette 117 in counteraction against the urging force so that is retracted from the cassette compartment for the time being until the spool shaft 117a moves to be located above the engaging member 113, which then pops up under the urging force to come into engagement wit the spool shaft 117a, so that it drives the latter permitting the user to easily set the camera ready for shooting.

After shooting is done, the user takes up the film in the cassette 117 and manipulates a control knob (not shown) to open the lid 112. Since the lid 112 is open at both ends as shown in FIG. 15, the user can have easy access to the cassette 117 for unloading it from the lid 112 by simply holding it with fingers.

It should be noted here that binocular's lens group and lens barrel are installed at either end of the cassette compartment in the camera body 111a.

Thus, in the second embodiment described above, the film cassette 117 is loaded or unloaded outside the binocular and camera combination 111 and, hence, this embodiment is best suited to the purpose of combining a binocular and a camera into a unitary assembly in and easy way.

The camera of the present invention enables the user to load or unload the film cassette in an easy manner and, in addition, both sides of the cassette compartment in the thrust direction of the cassette can be utilized efficiently to construct a more compact camera or manufacture a product that is an integral combination of a camera and another optical device such as binoculars. The invention also provides a camera having an engaging member that transmits a drive force to the spool shaft of a film cassette so as to rotate the spool shaft in a given direction, characterized in that the cassette compartment is provided inside the lid which is to be opened and closed for loading or unloading the film cassette. There is no need to provide spaces to form escapes in the inner surfaces of the cassette compartment, nor is it necessary to provide cutouts or spaces for loading and unloading the cassette; therefore, one only need provide a space of generally the same size as the cassette without the heretofore necessary spaces and cutouts and this contributes to a further reduction in the overall size of the camera.

As another advantage, both sides of the film cassette in its thrust direction can efficiently be used as spaces for mounting various drive mechanisms, optics, a battery compartment, etc. and this contributes to a greater degree of freedom in the system layout within the camera. It should be mentioned here that the engaging member to drive the spool shaft is adapted to be movable when loading or unloading the cassettes, namely, when opening or closing the lid in the case of the invention; details of the technical means for moving the engaging member have been described in connection with the first and second embodiments.

While two embodiments of the present invention have been described above, they may be modified as follows.

(1) A camera comprising a camera body, a lid member mounted in such a way that it is free to open or close with respect to the camera body, and a cassette holding means provided inside the lid member for holding the film cassette to be used within the camera body, the film cassette being loaded into or unloaded from the camera body as it is held by the cassette holding means, characterized in that the film cassette is held by the cassette holding means inside the lid member as a result of movement in a direction generally perpendicular to the film take-up shaft provided within the film cassette and that the lid member has an opening within at least part of the film cassette in an end portion along the film take-up shaft within the film cassette.

(2) A camera comprising a camera body, a lid member mounted in such a way that it is free to open or close with respect to the camera body, and a cassette holding means provided inside the lid member for holding the film cassette to be used within the camera body as it is held the cassette holding means, characterized in that all outer surfaces of the lid member provide part of the surfaces that define the external appearance of the camera.

As described in detail on the foregoing pages, the camera of the invention insures that film cassettes of a new format which depend upon a separate mechanism for film feeding can be easily loaded into the camera or unloaded therefrom in a redial direction and, at the same time, various drive mechanisms, optics, a battery compartment and even a large member such as a main capacitor for electronic flash can be installed on either side of the cassette in its thrust direction.

The cassette compartment can be opened or closed as required and the cassette is so adapted that it is inserted into this cassette compartment in a radial direction. When the cassette compartment is opened, the protrusion which helps film feeding and rewinding retracts and it pops up when the compartment is closed. Since the cassette compartment is open at both of its top and bottom ends, one can have no difficulty at all in unloading the cassette from the camera. Furthermore, the lid member which serves as part of the exterior surface of the camera contributes to the efficient use of the available space.

The present invention is in no way limited to the particular embodiments described hereinabove and it should be understood that various improvements and modifications can be made without departing from the spirit and scope of the invention.

According to the present invention, there is provided a camera that uses a compact film cassette loading or unloading mechanism depending on separate mechanism for film feeding. This enables the film to be loaded in the radial direction of film cassettes while permitting other elements to be installed on both sides of the cassette in its thrust direction.

What is claimed is:

1. A camera comprising:
a cassette compartment for receiving a film cassette, the cassette compartment having a length generally the same as that of the film cassette and including an opening for loading the film cassette into the cassette compartment, the opening being dimensioned to limit loading of said film cassette in a direction generally perpendicular to a rotating shaft of said film cassette;

an engaging member for engaging the rotating shaft of the film cassette when the film cassette is loaded in the cassette compartment, the engaging member being movable between a first position in which said engaging member protrudes into said cassette compartment and a second position in which said engaging member retracts from within said cassette compartment;

a lid rotatable between an open position in which the opening of said cassette compartment is exposed and a covering position in which the opening of said cassette compartment is covered; and means, operatively associated with said lid, for pushing said film cassette from said cassette compartment when the lid rotates from the covering position to the open position such that said film cassette moves said engaging member to the second position.

2. A camera according to claim 1, further comprising a hinge shaft, said pushing means and said lid being rotatable about said hinge shaft.

3. A camera according to claim 1, further comprising a hinge shaft, said pushing means and said lid being rotatable about said hinge shaft.

4. A camera for use with a film cassette, the camera comprising:
a camera body;
a film cassette compartment in said camera body for containing said film cassette, said film cassette compartment including at least two faces, the two end faces including a first end face proximate a first end of said film cassette and a second end face proximate a second end of said film cassette when said film cassette is loaded in said film cassette compartment between said two end faces;

a spool engaging shaft for engaging and rotating a spool shaft disposed in said film cassette, said spool engaging shaft being located on one of said first end face and said second end face such that said spool engaging shaft protrudes therefrom into said film cassette compartment, the spool engaging shaft: including a tapered portion axially movable to a position outside said film cassette compartment such that when the film cassette is inserted into said film cassette compartment the film cassette pushes the tapered portion of said spool engaging shaft to the position outside said film cassette compartment so as to permit continued insertion of the film cassette;

a lid movably coupled to said camera assembly such that the lid is movable between a covering position in which said film cassette compartment is covered and an open position in which the film cassette compartment is exposed; and film cassette ejecting means for ejecting the film cassette out of the film cassette compartment in response to said lid moving from the closed position to the open position, such that when said lid moves from the closed position to the open position, while the film cassette is contained in said film cassette compartment, the film cassette ejecting means ejects the film cassette from said film cassette compartment so that the film cassette axially moves said tapered portion of said spool engaging shaft to the position outside said film cassette compartment so as to permit continued ejection of the film cassette out of said film cassette compartment.

5. A camera comprising:
a cassette compartment for receiving a film cassette, the cassette compartment having a length generally the same as that of the film cassette and including an opening for loading the film cassette into the cassette compartment, the opening being dimensioned to limit said loading of said film cassette in a direction generally perpendicular to a rotating shaft of said film cassette;

an engaging member movable between a first position in which said engaging member protrudes into said cassette compartment and a second position in which said engaging member retracts from within said cassette compartment, said engaging member being moved from said first position to said second position by a side surface of the film cassette during insertion of the film cassette into the cassette compartment, and said engaging member engaging the rotating shaft of the film cassette when the film cassette is loaded in the cassette compartment;

a lid rotatable between an open position in which the opening of said cassette compartment is exposed and a covering position in which the opening of said cassette compartment is covered; and means, operatively associated with said lid, for pushing said film cassette from said cassette compartment when the lid rotates from the covering position to the open position such that said film cassette moves said engaging member to the second position.

* * * * *

UNITED STATES PATENT AND TRADEMARK OFFICE
CERTIFICATE OF CORRECTION

PATENT NO. : 5,708,900
DATED : January 13, 1998
INVENTOR(S) : Kunio YOKOYAMA et al.

It is certified that error appears in the above-identified patent and that said Letters Patent is hereby corrected as shown below:

Claim 4, column 12, line 35, after "shaft", delete ":".

Signed and Sealed this

Eighth Day of December, 1998

Attest:

BRUCE LEHMAN

Attesting Officer

Commissioner of Patents and Trademarks